April 2, 1968  E. S. MOYER  3,375,907
BRAKE ASSEMBLY
Filed Oct. 21, 1966

INVENTOR.
Elton S. Moyer
BY
*D. D. McGraw*
ATTORNEY

United States Patent Office 3,375,907
Patented Apr. 2, 1968

3,375,907
BRAKE ASSEMBLY
Elton S. Moyer, Dayton, Ohio, assignor to General Motors Corporation, Detroit, Mich., a corporation of Delaware
Filed Oct. 21, 1966, Ser. No. 588,347
8 Claims. (Cl. 188—76)

The invention relates to a brake assembly and more particularly to one having both organic and metallic brake linings.

Metallic brake linings utilized on conventional drum type brakes increase their frictional efficiency from a lesser "cold pedal" efficiency when the brakes are warm in relation to the cold condition. They also often generate unpleasant vibrations at near zero wheel speed, commonly referred to as "grunt." On the other hand, organic linings applied to conventional drum type brakes are subject to reduced frictional characteristics when overheated, these characteristics being commonly referred to as "brake fade." The cold pedal and unpleasant noise characteristics of metallic linings and the fade characteristics of organic linings have been minimized to some degree by utilizing one shoe lining of metallic material and the other shoe lining of organic material. While some improvement has been effected by this arrangement, it has been found that the metallic lining will wear rapidly since the organic lining removes the film from the brake drum deposited by the metallic lining and which is required for desirable performance of the metallic lining. It is a feature of the invention to utilize an external band and internal shoe type of brake figuration which provides separate drum friction braking surfaces for engagement by organic and metallic brake linings in order to obtain the benefits of this combination of linings without having to accept the undesirable effects resulting from using the same drum surface for both lining materials. Thus in one concept of the invention the external band member, acting as the primary shoe assembly of a duo-servo brake, will have a suitable organic friction lining engaging the external surface of the brake drum; while the internal shoe, acting as the secondary shoe, will have a suitable metallic friction lining engaging the internal surface of the brake drum. In another concept of the invention the organic friction lining may engage the internal drum surface, while the metallic lining may engage the external drum surface. Other combinations of internal and external linings with respect to primary and secondary elements and with respect to organic and metallic linings may also be utilized.

Figure 1:
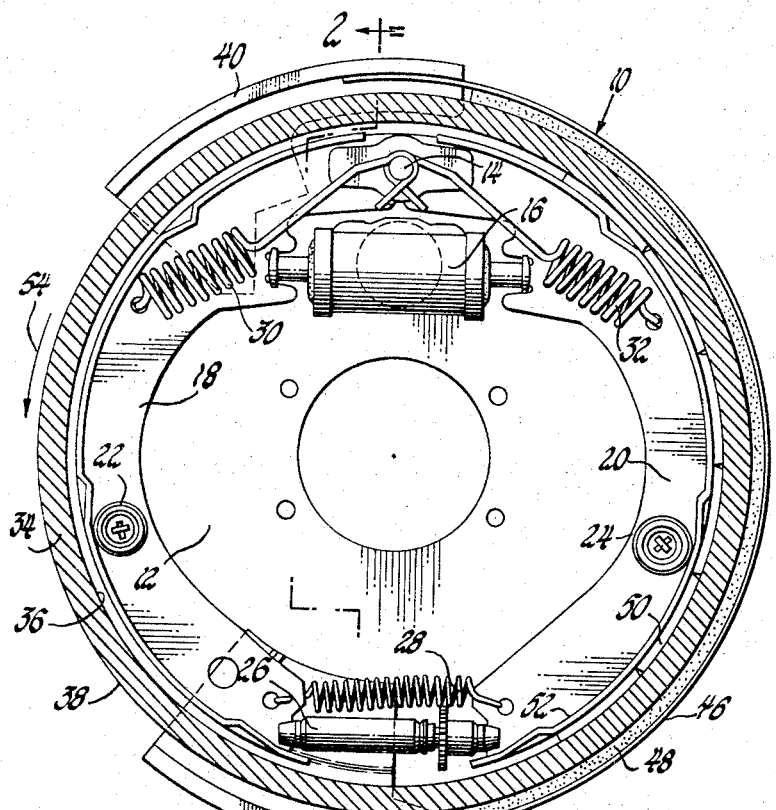
FIGURE 1 is an elevation view of a brake assembly embodying the invention, with parts shown in section.

The brake assembly 10 includes a backing plate 12 to which is secured an anchor pin 14 and a wheel cylinder 16. A primary shoe frame 18 and a secondary shoe frame 20 are floatably mounted on the backing plate by hold-down springs 22 and 24. A suitable adjuster 26 interconnects the lower ends of the shoe frames 18 and 20, and is held in place by spring 28. The upper ends of the shoe frames engage the anchor pin 14 and the opposed push rods of the wheel cylinder 16. Retraction springs 30 and 32 respectively hold the shoe frames in engagement with the wheel cylinder push rods and urge the frame upper ends toward the anchor pin 14. The brake drum 34 is mounted in the usual manner for rotation with a vehicle wheel, not shown. The drum is provided with an internal friction braking surface 36 and an external friction braking surface 38.

Figure 2:
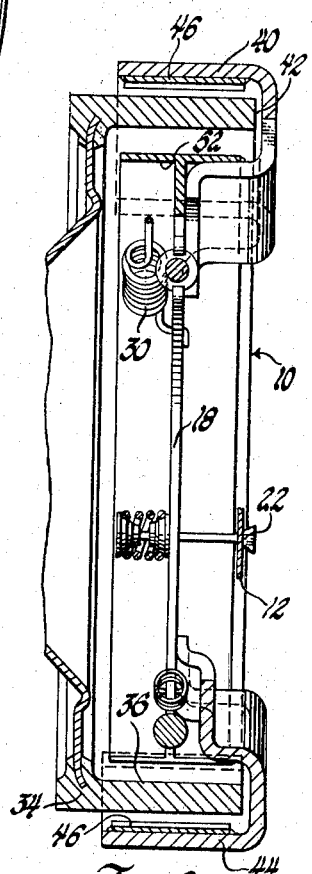
FIGURE 2 is a cross section view with parts broken away of the brake assembly of FIGURE 1, taken in the direction of arrows 2—2 of that figure.

The primary shoe frame 18 is provided with an upper bracket 40 attached to the upper end of the shoe, as is best seen in FIGURE 2. The bracket is generally U-shaped so that it extends outwardly around the end 42 of the drum and then circumferentially outwardly of the external friction braking surface 38. A similar bracket 44 is secured to the lower end of the primary shoe frame 18. A strap 46 has its ends secured to the brackets 40 and 44 so that it is circumferentially outward of the brake drum and on the same side of the brake drum as is secondary shoe frame 20, as seen in FIGURE 1. Brackets 40 and 44 extend circumferentially beyond the ends of the primary shoe frame 18 so that a brake drum diameter passes through both brackets, and the portion of the strap 46 between the two brackets subtends an arc less than 180 degrees. A brake lining 48 is mounted internally of strap 46 so that it is in engageable relation with the external friction braking surface 38 of the drum 34. Brake lining 50 is secured to the rim 52 of the secondary shoe frame 20 so that it is in engageable relation with the internal friction braking surface 36 of the drum 34. The brake lining 48 is positioned so that it engages an area of the drum outer friction surface which is radially outward of the drum inner friction surface area simultaneously engaged by the brake lining 50. In the embodiment shown in FIGURE 1, the brake lining 48 is an organic lining and the brake lining 50 is a metallic lining.

When the wheel cylinder 16 is energized, and the drum is rotating in the forward direction indicated by arrow 54, the primary shoe frame 18 is moved outwardly, causing lining 48 to engage the drum external braking surface 38 in frictional relation. Secondary shoe frame 20 is also moved outwardly by wheel cylinder 16. There is also a mechanical servo action caused by engagement of lining 48 with the drum which acts through primary shoe frame 18 and adjuster 26 to further move the secondary shoe lining 50 into engagement with the drum internal surface 36. Thus the organic lining 48 always works on the external braking surface and the metallic lining 50 always works on the internal braking surface 36. The metallic coating deposited on the internal braking surface 36 by metallic lining 50 will not be removed by the organic lining, and the metallic portion of the brake can then operate more efficiently than is the case when organic and metallic linings operate on the same friction surface.

Figure 3:
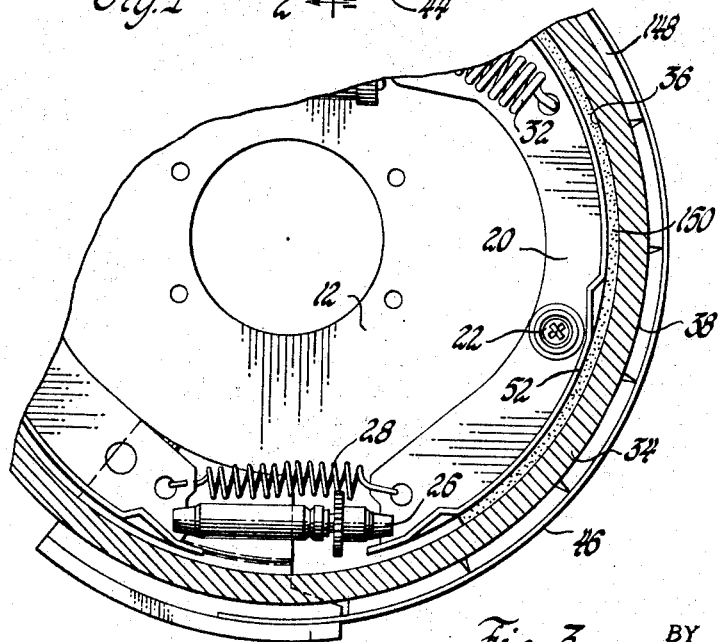
FIGURE 3 is a view similar to FIGURE 1, with parts broken away, illustrating a modified form of the brake assembly embodying the invention.

A modified form of the brake assembly of FIGURE 1 is illustrated in FIGURE 3 wherein the metallic lining 148 is provided on the strap 46 and the organic lining 150 is provided on the secondary shoe frame rim 52. Other modifications may be provided in which the external brake lining is associated with a secondary shoe frame and the internal lining is associated with the primary shoe frame.

I claim:

1. A brake assembly comprising:
   a rotatable drum to be braked having an inner friction braking surface and an outer friction braking surface,
   a backing plate,
   a first brake shoe frame and a second brake shoe frame movably mounted on said backing plate,
   one of said shoe frames having metallic friction brake lining mounted thereon for frictionally engaging one of said friction braking surfaces,
   the other of said shoe frames having organic friction brake lining mounted thereon for frictionally engaging the other of said friction braking surfaces,
   and means interconnecting said shoes and actuable to move said shoes to engage said friction brake linings with their respective drum friction braking surfaces.

2. The brake assembly of claim 1, said first brake shoe frame having an external strap secured thereto mounting said metallic friction brake lining for frictional engagement with said drum outer friction surface.

3. The brake assembly of claim 1, said first brake shoe frame having an external strap secured thereto mounting said organic friction brake lining for frictional engagement with said drum outer friction surface.

4. The brake assembly of claim 1, said shoe frames being mounted internally if said drum, said first shoe frame having bracket means extending outwardly of said drum and a strap secured to said bracket means adjacent said drum outer friction surface, one of said friction brake linings being mounted on said strap.

5. The brake assembly of claim 4, said one friction brake lining mounted on said strap engaging a drum outer friction surface area radially outward of the drum inner friction surface area simultaneously engaged by the other friction brake lining on said second shoe frame, said drum outer friction surface area engaged by said one friction brake lining extending circumferentially about said drum less than 180° of arc.

6. The brake assembly of claim 4, said bracket means comprising first and second brackets mounted on opposite ends of said first shoe frame and having the ends of said strap respectively secured thereto, the portion of said strap between said brackets extending circumferentially about said drum outer friction surface for less than 180° of arc.

7. The brake assembly of claim 4, said first and second brake shoe frames being floatably mounted on said backing plate for mechanical servo action upon brake energization.

8. The brake assembly of claim 7, said first brake shoe frame being the primary shoe frame and said second brake shoe frame being the secondary shoe frame of a duo servo brake.

References Cited
UNITED STATES PATENTS 1,845,846   2/1932   Norton.
3,159,245   12/1964   Dotto _____ 188—76

DUANE A. REGER, *Primary Examiner.*